W. H. Link.
Impt. in Churns.
No. 119,870. Patented Oct. 10, 1871.
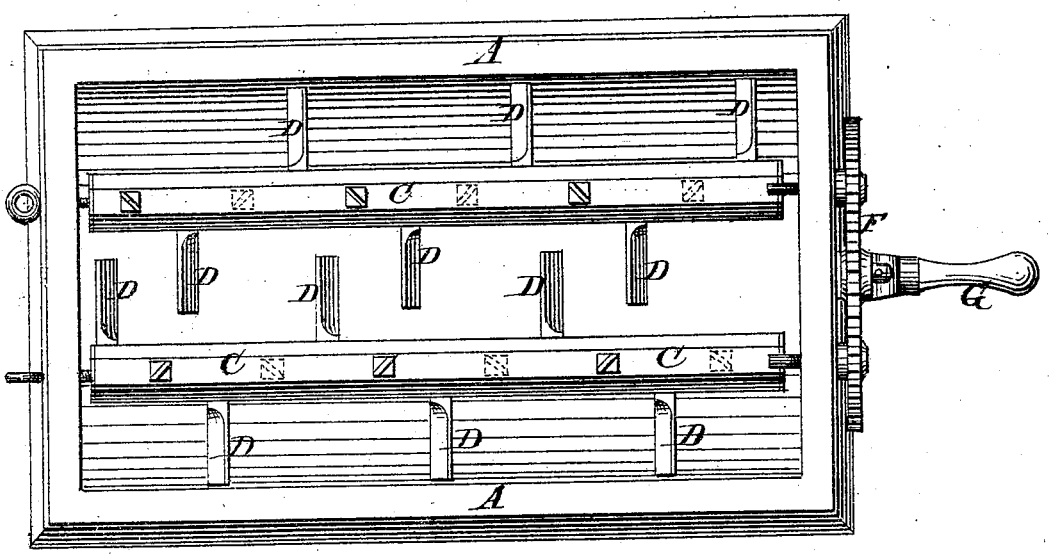
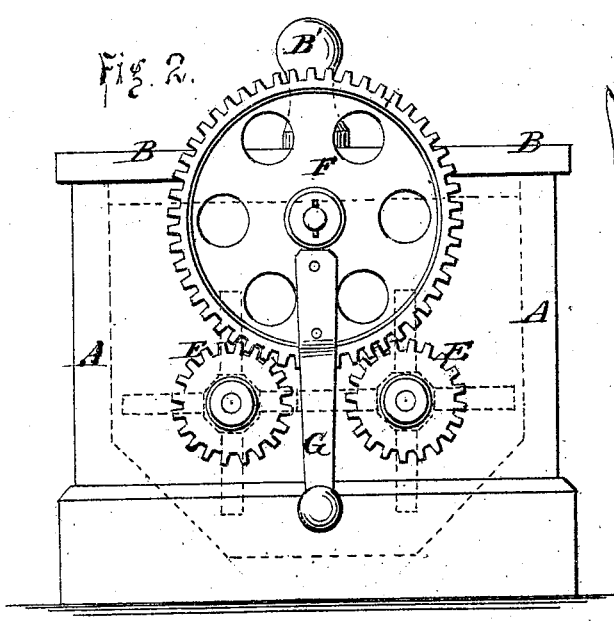
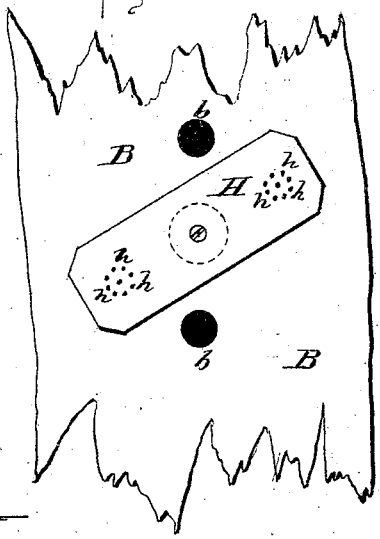
Witnesses
Inventor
William H. Link, by
Prindle and Dyer, his
Attys.

119,870

UNITED STATES PATENT OFFICE.

WILLIAM H. LINK, OF SHANESVILLE, OHIO.

IMPROVEMENT IN CHURNS.

Specification forming part of Letters Patent No. 119,870, dated October 10, 1871.

*To all whom it may concern:*

Be it known that I, WILLIAM H. LINK, of Shanesville, in the county of Tuscarawas and in the State of Ohio, have invented certain new and useful Improvements in Churns; and do hereby declare that the following is a full, clear, and exact description thereof, reference being had to the accompanying drawing making a part of this specification, in which—

Figure 1 is a plan view of my device with the cover removed. Fig. 2 is an end elevation of the same; and Fig. 3 is a plan view of a portion of the lower side of said cover, showing the ventilating arrangements.

Letters of like name and kind refer to like parts in each of the figures.

My invention is an improvement in that class of churns which acts on the cream by means of a pair of horizontal spirally-bladed dashers rotating in the same direction; and it consists in an improved mode of setting the blades of the dashers so as to insure efficient and rapid action, substantially as is hereinafter specified.

In the annexed drawing, A represents the churn or reservoir for containing the cream, constructed preferably in the form of an oblong box, inclosed at its upper open side by means of a cover, B, all in the usual manner. Pivoted horizontally and longitudinally within the reservoir are two shafts, C, from each of which extend radially outward a series of arms, D, having transversely a flat shape, which arms are arranged spirally and in the same direction around said shafts, and each have their faces placed at relative angles with their shaft of about forty-five degrees, but at an opposite or a right angle with those of or upon the opposite shaft, the whole forming the dashers. The ends of the shafts or their journals project outward through one end of the reservoir, and are each provided with a pinion, E, which meshes with and receives motion from a gear-wheel, F, that is pivoted upon a stud, *f*, projecting horizontally outward from the end of said reservoir. A crank-handle, G, secured to or upon the outer face of said gear, furnishes a means whereby the same may be revolved, and the motion thus obtained is communicated through said pinions to the dashers, causing them to revolve in the same direction and with the same velocity.

As thus arranged and operated, it will be seen that the interlocking or meshing-arms have the planes of their faces parallel as they pass each other; but, as one set of said arms is moving upward while the opposite set is moving downward, their action upon the cream will be such as to force it in opposite directions horizontally, and thereby more thoroughly agitate the same than would be possible were said arms so arranged as to move said cream in one direction only.

When the cream is thoroughly churned, by removing one of the dashers and revolving the remaining dasher the butter will be gathered and forced into a compact mass at one end of the reservoir.

Passing vertically through the cover B are two openings, *b*, for ventilating purposes, which are partly or entirely closed, when desired, by means of a metal plate, H, that is secured to or upon the lower end of a knob, B', passing through said cover midway between said openings, and may be rotated horizontally beneath and against said cover. A series of perforations, *h*, formed in and through the plate in positions corresponding to those of the openings *b* when said plate is placed squarely over the same, permits a certain degree of communication between the exterior and interior of the churn, which communication can, if desired, be entirely cut off by turning said plate to one side so as to bring its solid parts beneath said openings.

Having thus fully set forth the nature and merits of my invention, what I claim as new is—

The compound churn-dasher herein described, consisting of the two parallel horizontal shafts C C, adapted to be rotated in the same direction, and carrying the spirally-arranged blades D D, beveled diagonally, and so placed that the faces as they pass each other in the center shall be parallel, substantially as and for the purpose specified.

In testimony that I claim the foregoing I have hereunto set my hand this 10th day of June, 1871.

W. H. LINK.

Witnesses:
 WM. ORIN,
 G. W. ERWIN. (45)